(12) United States Patent
Parkinson (10) Patent No.: US 12,041,388 B2
(45) Date of Patent: Jul. 16, 2024

(54) REMOTE ANNOTATION OF LIVE VIDEO FEED

(71) Applicant: RealWear, Inc., Vancouver, WA (US)

(72) Inventor: Chris Parkinson, Vancouver, WA (US)

(73) Assignee: REALWEAR, INC., Vancouver, WA (US)

( * ) Notice: Subject to any disclaimer, the term of this patent is extended or adjusted under 35 U.S.C. 154(b) by 0 days.

(21) Appl. No.: 17/805,948

(22) Filed: Jun. 8, 2022

(65) Prior Publication Data

US 2023/0403372 A1    Dec. 14, 2023

(51) Int. Cl.
*G06T 19/00*    (2011.01)
*H04N 7/025*    (2006.01)

(52) U.S. Cl.
CPC .......... *H04N 7/025* (2013.01); *G06T 19/006* (2013.01)

(58) Field of Classification Search
CPC ............... G06T 19/006; H04N 7/025
See application file for complete search history.

(56) References Cited

U.S. PATENT DOCUMENTS

2002/0158873 A1* 10/2002 Williamson .............. G06T 7/85
                                                              345/427
2018/0067717 A1*  3/2018 Limaye .................. G10L 15/08

* cited by examiner

*Primary Examiner* — Wing H Chow
(74) *Attorney, Agent, or Firm* — Shook, Hardy & Bacon L.L.P.

(57) ABSTRACT

The invention is directed towards a system where a head-mounted display (HMD), or other head mounted computing device, may annotate video data captured by the HMD. When a video is annotated on the computer processor, the data packet associated with that digital marker is encoded as an operation-encoded audio packet and sent over a secure audio link to the HMD. Sending the operation-encoded audio packet over the secure audio link requires the HMD to decode the packet into a data packet which may then be used to annotate a display on the HMD. The user of the HMD may be able to view his own recorded field of view on a display device which may then be annotated using the data in the data packet.

20 Claims, 7 Drawing Sheets

REMOTE ANNOTATION OF LIVE VIDEO FEED

BACKGROUND

Users of head-mounted computing devices, such as head-mounted displays (HMDs), often use the head-mounted computing devices to record video and audio data via sensors in the head-mounted computing device. For example, a user wearing a HMD while working on a machine may record a point of view of the user via one or more cameras included in the HMD. Further, the user may be assisted by a technician monitoring, via a third party communications network, the recorded point of view in a remote location on a separate device. The recorded video and audio data may then be viewed by the technician who may desire to annotate or digitally point to an object within the HMD user's point of view. However, the secure third party communications network typically does not allow for the technician to modify the visual data with modifications or digital markers. To account for this, some traditional systems may allow for sending instant messages within the communication network but there is nothing which provides a way for the technician to annotate the video feed of the HMD user. There is no current way to send digital markers to the video feed through conventional systems.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

In contrast to conventional systems, such as those described above, embodiments of the present system are generally directed to a system which allows the technician in a remote location to send digital markers or modifications to the video feed over the secure audio link between the technician and the HMD. According to some examples, as a user captures video data via an HMD or other head mounted computing device, video data captured by the HMD may be annotated by a separate remote computer processor displaying the captured video data. When a video is annotated on the remote computer processor, the data packet associated with that digital marker is encoded as an operation-encoded audio packet. This may allow for sending the data packet as an operation-encoded audio packet over the secure audio link within the third party communication network. Sending the operation-encoded audio packet over the secure audio link requires the HMD to decode the packet into a data packet. This data packet may then be used to annotate a display on the HMD. The user of the HMD may be able to view his own recorded field of view on a display device which may then be annotated using the data in the data packet.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-6 illustrate an embodiment of the present invention and in which:

DETAILED DESCRIPTION

The subject matter of the present technology is described with specificity in this disclosure to meet statutory requirements. However, this description is not intended to limit the scope hereof. Rather, the claimed subject matter may be embodied in other ways, to include different steps, combinations of steps, features, and/or combinations of features, similar to the ones described in this disclosure, in conjunction with other present or future technologies. Moreover, although the terms "step" and "block" may be used to identify different elements of methods employed, the terms should not be interpreted as implying any particular order among or between various steps or blocks unless and except when the order of individual steps or blocks is explicitly described and required.

Many virtual meeting platforms (e.g., Zoom, Microsoft Teams, etc) have chat functionalities. Some of these meeting platforms may even have some form of a whiteboard or ability to functionally draw on a screen. Other remote hosting functionalities may be present to some degree but none have the ability to perform live annotation. The virtual meeting platforms used also require the user to use the software of the virtual meeting platform to perform any of these functionalities. There is nothing currently which allows the user of a virtual meeting platform to use a third party application to annotate or modify the live video recording. As such, there is a need for a system which may easily perform remote host functions like annotate or modify the virtual meeting, and do it regardless of the underlying virtual meeting program being used.

In some embodiments of the present invention, a head-mounted display (HMD) may include a video recording device which records the field of view of the user wearing or otherwise utilizing the HMD. The HMD may also be able to display that video recording on a display device mounted to the HMD or within the view of the user. The HMD may further send that video recording over a third party communication network to a remote user in a separate location. The remote user may be able to view the video recording using a third party communication network's application installed on a computing device. While viewing the video recording, the remote user may wish to annotate the recording by using a separate application on the computing device, the remote user may annotate the video recording. To send the digital marker to the HMD so the HMD user may view it, the separate application may encode the digital marker as an operation-encoded audio packet to be sent over the audio stream of the third party communication network. As such, a virtual microphone may be used to inject the operation-encoded audio packet into the audio stream.

Once the operation-encoded audio packet is injected into the audio stream, it is sent over the third party communication network's audio link to the HMD. The HMD may detect the presence of the operation-encoded audio packet in the audio stream. The HMD may then decode the operation-encoded audio packet into a data packet which may include instructions for an application installed on the HMD to annotate the display of the video recording. This digital marker may be an overlay over the video recording.

In some embodiments, a head-mounted computing device may comprise a visual display module which displays the live video feed recorded by the HMD. The head-mounted computing device may also comprise one or more processors and one or more memory devices storing programmable instructions thereon that, when executed by the one or more processors, cause the one or more processors to execute operations. Such operations include causing to be displayed on the visual display module, a display of an image captured by the head-mounted computing device and receiving, from a user device, an audio stream. The one or more processors may actively monitor the audio stream for the presence of an operation-encoded audio packet. To detect the operation-encoded audio packet, the HMD may actively look for signals which indicate the presence of the operation-encoded audio packet. Upon receiving an operation-encoded audio packet from the remote user device, the HMD may decode the first operation-encoded audio packet into a data packet which is usable by the application installed on the HMD. The application may then modify the display of the live video captured by the head-mounted computing device based on data in the HMD data packet. The data within the data packet may include various instructions to modify or annotate the video. The instructions may also include a location within the video so that the application may annotate a particular object within the video recording.

In further embodiments of the present invention, a non-transitory computer storage medium, storing computer usable instructions that, when used by the one or more computing devices, cause the one or more computing devices to perform operations. Those operations include but are not limited to causing to be displayed on one or more remote computing devices, a display of the live video captured by a head-mounted computing device. This video captured may be sent to the remote computing device using a third party communication network and may also include a detailed three-dimensional location of objects within the video. For example, if the HMD video is viewing a piece of machinery, the HMD video may identify the three-dimensional location of various parts of the piece of machinery. This location information may be sent embedded in the video to be used by an digital marker application on the remote computing device or as a separate operation-encoded audio packet. The computing device may then receive, from the digital marker application on the one or more computing devices, a modification data packet. This data packet may include the instructions of what digital markers to perform on the video and where to put the digital markers with respect to the objects identified by the three-dimensional locations. For example, the user of the remote computing device may, within the digital markers application, select an object within the video feed to annotate. The user may then indicate what type of digital marker they wish to perform such as adding a marker, a text, or a highlighted portion. This digital marker is then converted into audio data to be sent over the third party communications audio link.

In some embodiments, a computer implemented method may be utilized to display on one or more computing devices, a display of a live video image captured by a head-mounted computing device. The computing devices may then receive, from a digital marker application on the one or more computing devices, a modification data packet and then encode the modification data packet into an operation-encoded audio packet. The operation-encoded audio packet is then sent over the audio stream from the computing devices to the head-mounted computing devices using a secure audio link which audio link is being used by the users of the head-mounted computing device to communicate with the one or more computing devices. A virtual microphone may be used to inject the operation-encoded audio packet into the audio feed and it may be able to be heard by the human ear or it may be ultrasonic. The operation-encoded audio packet is then received by the head-mounted computing device and decoded into instructions of how to annotate the live video feed. While the user of the HMD may move the video feed around, the head-mounted computing device may maintain a location of the various objects identified in the video using inertial measurements and three-dimensional mapping techniques. As such, the digital marker of the desired object within the video feed may remain associated with the location of the object.

By way of a non-limiting example, assume a first user of the HMD is an electrician working at a job site and a second user of a remote computing system is training the electrician from a remote location. As the electrician is viewing and recording, with the HMD, his/her POV, which includes images or video of a fuse box, the second user can also view the images or video via the live video feed, identify a particular fuse to be fixed, and create a digital marker that corresponds to the particular fuse within the video feed. For example, the desired digital marker may be placed at the digital location of the fuse within the video feed viewed by the second user. The creation of the digital marker can then be packaged as a set of digital marker instructions that are encoded by the remote computing system into an operation-encoded audio packet and communicated over the audio link to the HMD via the network. As the HMD is monitoring the secure audio link, it can detect the operation-encoded audio packet. Once detected, the HMD can then decode the set of digital marker instructions, interpret the set of digital marker instructions, and generate the digital marker to annotate the images of video of the fuse box in accordance with the instructions created by the second user.

Figure 1:
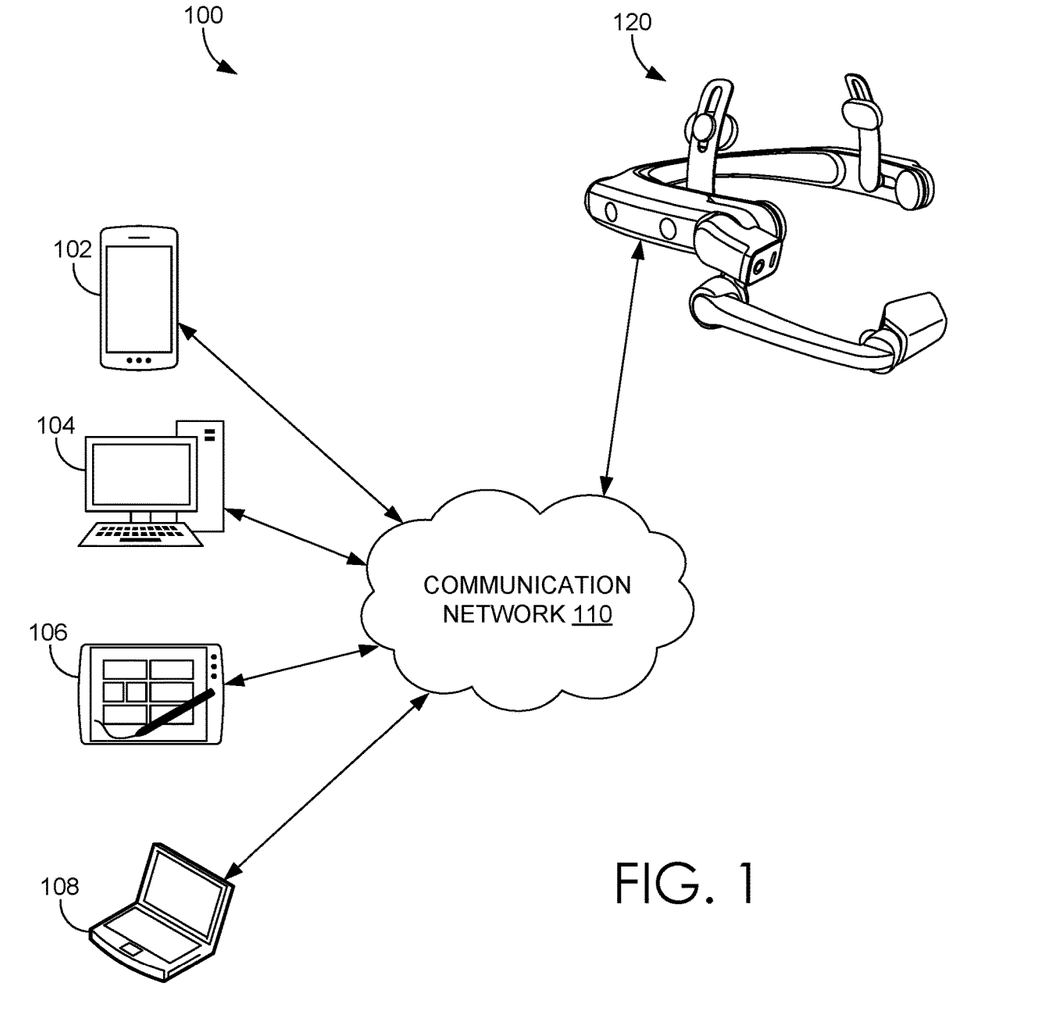
FIG. 1 illustrates a schematic diagram showing an example operating environment 100 for operating a wearable device, in accordance with an embodiment of the present disclosure.

Turning initially to FIG. 1, FIG. 1 illustrates a schematic diagram showing an example operating environment 100 for operating a wearable device in accordance with some implementations of the present disclosure. Operating environment 100 includes one or more wearable devices, such as but not limited to head-mounted display (HMD) device 120 and one or more user computing devices. Such user computing devices include, but are not otherwise limited to smartphone 102, desktop 104, tablet 106, and laptop 108. Various embodiments of HMD device 120 are discussed in conjunction with at least FIGS. 1-6. However, briefly here, HMD device 120 is a wearable computing device that provides computing and communication capabilities to the wearer. In the non-limiting body shown in FIG. 1, a wearable device (e.g., HMD device 120) may be worn about the head of the user. Other embodiments are not so limited. Various embodiments of user computing devices, such as computing devices 102-108 are discussed in conjunction with FIG. 7.

Operating environment 100 additionally includes a communication network, such as but not limited to communication network 110, which communicatively couples each of user computing devices 102-108 and HMD device 120. Communication network 110 may be any communication network, including virtually any wired and/or wireless communication technologies, wired and/or wireless communication protocols, and the like. It should be understood that communication network 110 may be virtually any network that communicatively couples at least one of user computing devices 102-108 with a wearable device, such as but not limited to HMD device 120.

In one embodiment, communication network 110 may be a third party communication network which communicatively couples the at least one user computing device with a wearable device such as HMD device 120. For example, at least one of the user computing devices 102-108 may communicate with the HMD device 120 through a secure link established using the third party communication network. This third party communication network may allow visual and audio information or data to be transmitted between the user computing device and the HMD device 120, such as the operation-encoded audio packets and visual recordings. One portion of the third party communication network retrieves audio and visual data from at least one of the user computing devices 102-108 and sends that data through an established secure link between the user computing device and the HMD device 120. The HMD device 120 may then retrieve the visual and audio data and display the video and play the audio. The display of the visual recordings may be done using an application associated with the third party communication network.

User computing devices 102-108 include various electroacoustic transducers (e.g. microphones and audio speakers). An electroacoustic transducer may be a primary microphone or set of microphones. In some embodiments the primary microphone may comprise at least one directional microphone that is configured such that it may detect voice commands of the user. In various embodiments, user computing devices 102-108 include one or more additional electroacoustic transducers, including but not limited to one or more auxiliary microphones.

User computing devices 102-108 a can further comprise a display component, such as a monitor, a touch screen, liquid crystal display (LCD), or the like. In various embodiments, the user computing devices 102-108 will include at least one input device able to receive conventional input from a user. This conventional input can include, for example, a push button, touch pad, touch screen, wheel, joystick, keyboard, mouse, keypad, or any other such device or element whereby a user can input a command to the device. The user computing devices 102-108 may be able to display a visual recording sent by the HMD device 120. The visual recording of the HMD device 120 may be a visual representation of what the user or wearer of the HMD device 120 is viewing. As such, the user computing devices 102-108 may be configured to display the visual recording of the HMD device 120 at a particular time. Such particular time may be instantaneous or in the past using a pre-recorded visual recording.

User computing devices 102-108 may be configured to annotate or modify the displayed image of the visual recording of the HMD device 120. A user of the user computing devices 102-108 may select a portion of the displayed image to annotate using a user device application. Such application may be installed on the user computing devices 102-108. This application is in addition to an application which is used to transmit communications from the user computing devices 102-108 to the HMD device 120 and display the recorded video. The user of the user computing devices 102-108 may select or indicate what sort of digital markers or modifications to be performed to the portion selected. As an example, the user of the HMD device 120 may initially have in their field of view (FOV) a portion of an automobile engine and the HMD device 120 may be recording that same portion of the automobile engine, or recording the FOV of the user of the HMD device 120. Such a recording may then be transmitted over the communication network 110 and displayed on the user computing devices 102-108. The digital marker application may operate in tandem with the transmission application to display both the recording of the FOV of the user and an additional layer of digital markers or modifications. Prior to the user indicating any desired modifications to the recording of the FOV, the additional layer displayed over the recording of the FOV may be blank or transparent.

The user of the user computing devices 102-108 may then indicate by clicking a location on or selecting a portion of the image they wish to annotate or modify. This portion or location may correspond to a location within the FOV of the user of the HMD device 120. Additionally, the user of the user computing devices 102-108 may indicate what digital marker or modification they wish to perform on the displayed image. Such digital marker or modification may be placing a marker or indicator where the user clicked or highlighting an area the user selected. Additional digital markers or modifications may be, but are not limited to, adding letters or numbers in the location, adding a picture at the location, adding a shape around the portion of the image, or some other form of digital marker or visual modification to the image. The digital marker(s) or modification(s) will then appear in the layer displayed using the digital markers application over the recording of the FOV in the desired or selected location.

User computing devices 102-108, may encode the desired modification(s) or digital marker(s) as a packet of data. Such data may indicate the coordinates of the desired modification on the image and the type of modification desired and may be implementable using an application installed on the HMD device 120. For example, the packet of data may indicate that the user of the computing devices 102-108 selected or clicked on the location with a particular display coordinates. The data may also indicate that the user of the computing devices 102-108 wishes to annotate that location on the image by placing a text or indicator at that location.

Figure 2:
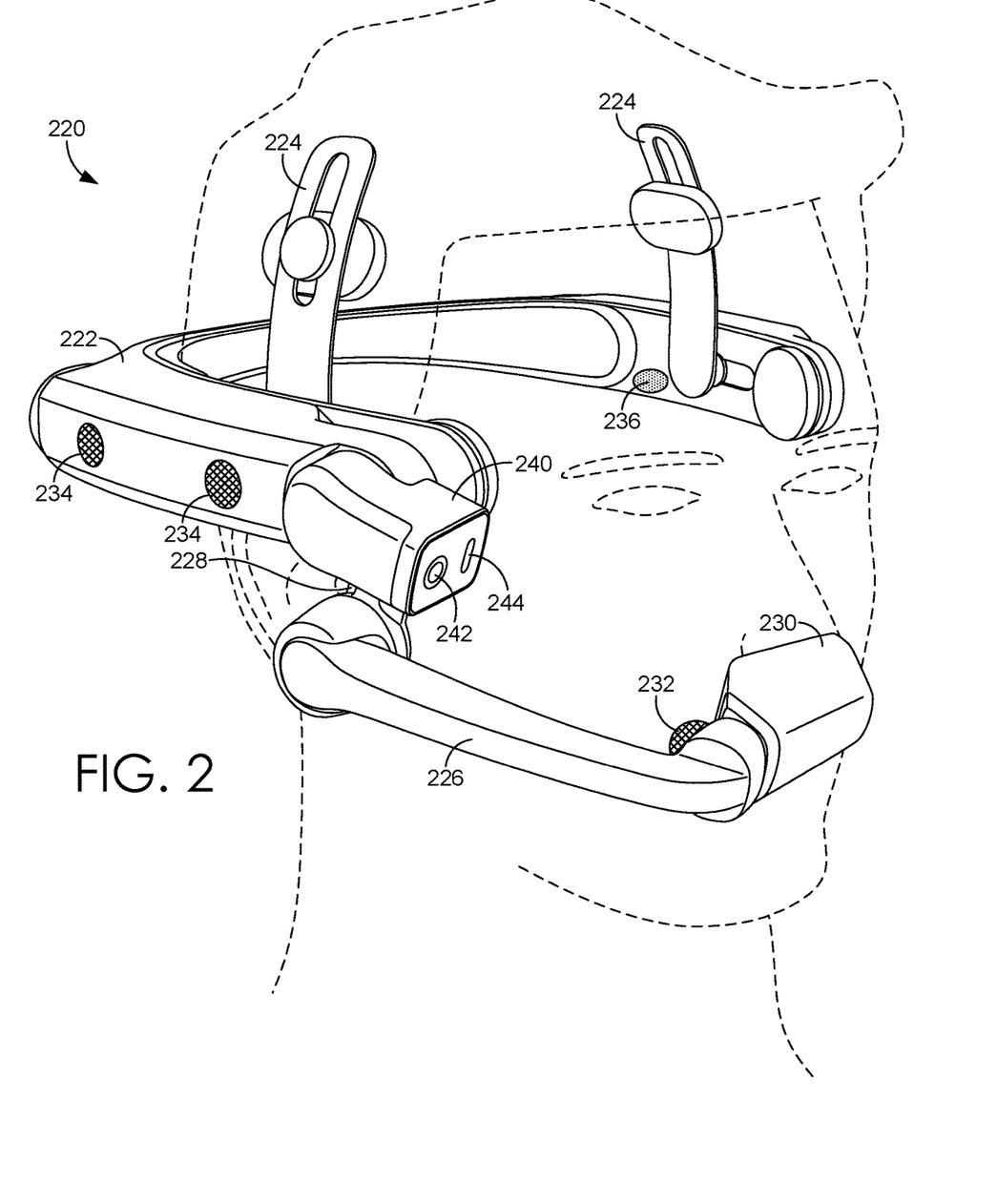
FIG. 2 illustrates an example embodiment of a HMD device, in accordance with some implementations of the present disclosure.

Turning to FIG. 2, FIG. 2 illustrates an example embodiment of a HMD device 220, in accordance with some implementations of the present disclosure. HMD device 220 is a wearable device. HMD device 220 may be similar to HMD device 120 of FIG. 1. HMD device 220 includes a frame member 222. Frame member 222 may be a frame structure. As shown in FIG. 2, frame member 222 is configured and arranged for wearing by a user. For instance, frame member 222 may be worn about the user's head. HMD device 220 may additionally include one or more stabilizing members 224 (or stabilizing structures) that stabilize the frame member 222 about the user's head.

HMD device 220 may include one or more rotating members, such as but not limited to first rotating member 226 and second rotating member 228. At least one of rotating members 226 or 228 is rotatably coupled to frame member 222, i.e., at least one of rotating members 226 or 228 is coupled to frame member 222 and configured and arranged for rotating relative to frame member 222. In at least one embodiment, first rotating member 226 may be a boom arm that is coupled to a display module 230. Display module 230 houses a display device that is directed towards the eyes of the user. As shown in FIG. 2, the display device is within the user's line-of-sight (LOS). In some embodiments, the user may re-position the display device, via a rotation of one or more of rotating members 226/228, such that the display device is excluded from the user's LOS. Note that in the view of HMD device 220 shown in FIG. 2, the display device is occluded by external surfaces display module 230.

HMD device 220 includes various electroacoustic transducers (e.g., microphones and audio speakers). One such electroacoustic transducer 232 is located near a distal end of first rotating member 226. Electroacoustic transducer 232 may be a primary microphone or set of microphones. In some embodiments, electroacoustic transducer 232 may comprise at least one directional microphone that is configured such that it may detect voice commands of the user. In various embodiments, HMD device 220 includes one or more additional electroacoustic transducers, including but not limited to one or more auxiliary microphones 234 and one or more audio speakers which may be coupled to frame member 222, such as but not limited to audio speaker 236.

In some embodiments, a plurality of microphones 234 may be distributed (e.g., uniformly) on the frame member 222 to provide spatial audio detection and to aid in identifying voice commands in order to remove, subtract, replace and/or neutralize them from/in audio data. For example, a plurality of omnidirectional auxiliary microphones 234 may be distributed on the frame member 222 and a directional microphone 232 located near a distal end of first rotating member 226, which may be directed at a user's mouth, may each be linked to a computing device of the HMD device 220 that may record audio signals detected via the plurality of omnidirectional auxiliary microphones 234 and the directional microphone 232. The recorded audio signals may be interpreted by the computing device of the HMD device 220 into a coherent form such that audio signals from each of the omnidirectional auxiliary microphones 234 and the directional microphone 232 may be jointly processed to allow for parsing signals coming from a given direction and remove audio signals corresponding to voice commands from a user.

In further embodiments, the location of directional microphone 232 may be determined based on one or more position-detecting sensors and/or switches configured to detect an angle of first rotating member 226. Such sensors and/or switches may include, but are not otherwise limited to Hall Effect sensors and/or Hall Effect switches. Other such sensors and/or switches may also include, but are not limited to, optical sensors that detect optical encodings, mechanical switches, capacitive sensors, conductive switches, magnetic switches, and the like. Given a known physical spatial relationship between each of the auxiliary microphones 234 and directional microphone 232, simultaneous DSP (digital signal processor) processing of the signals from each of the individual microphone elements may be used to create one or more "virtual" microphones. Virtual microphones with a set of virtual polar patterns may then be used to steer individual lobes of each of the set of the virtual microphone patterns to focus on and/or reject, particular sources of sound, such as a mouth of a user speaking a voice command.

In additional embodiments, the DSP may be utilized to process the audio signal or audio link received over the communication network 110 from at least one of the user computing devices 102-108. Such audio signal may contain an operation-encoded audio packet from the at least one user computing device which was encoded from the digital marker data packet as described above. The operation-encoded audio packet may also contain a signal or indicator which may initiate a process wherein the DSP (or any other signal processing device) may capture or record the operation-encoded audio packet as a digital file. The operation-encoded audio packet may then be decoded, using a processor, into a data packet which instructs the display module to overlay a display of the FOV of the user with the desired digital markers from at least one of the user computing devices 102-108. In an additional embodiment, the data packet may instruct the display module to modify the display of the FOV with the desired digital markers or modifications. The display module may display the FOV of the user using a third party application installed on the wearable platform as described in FIG. 5. Additionally, the display module may display the digital markers or modifications as an overlay using the third party application or another application installed on the wearable platform.

Further, HMD device 220 may include an optical module 240 that houses one or more photon detectors (e.g. camera devices), such as photon detector 242 and a projection system 244. Projection system 244 may include one or more photon-emitters (e.g., scanning lasers, scanning light emitting diodes (LED), and the like). Optical module 240 may be configured and arranged to rotate relative to frame member 222, such that the FOV of the photon detector 242 may be rotationally varied. In at least some rotational orientations of optical module 240, the FOV of photon detector 242 is at least similar to the FOV of the user.

In other embodiments, the optical module 240 can determine the three dimensional positions of image features within the FOV of the photon detector 242 (e.g., the three dimensional positions of the image features relative to each other, and/or the absolute three dimensional positions of the image features). The three dimensional positions of the features can be determined based on some or all of the captured image data that corresponds to the features. Exemplary techniques for determining three-dimensional positions of features in image data can include simultaneous localization and mapping (SLAM) techniques. Based on the determined three dimensional positions of the one or more features, the optical module 240 can also localize the camera (and/or the device including the camera) with respect to the object(s) and scene being scanned. In some examples, optical module 240 can further include one or more inertial measurement units (IMUs), measurements from which can be used to further inform the determined position/rotation of the optical module 240 as it moves while the user scans the scene and object(s) in from of the HMD device 220.

The display device may be able to display in one embodiment the FOV of the user in real-time. This may be so that the user may see what is being transmitted over the communication network 110 from the HMD device 120 to at least one of the user computing devices 102-108 to be displayed. Additionally, the display device may display an additional layer along with the FOV recording of the user. For instance, an application installed on the wearable device 500 as described in relation to FIG. 5 may display the visual feed or visual data collected by the optical module 240 and photon detector 242. In addition to the visual data collected by the photon detector 242, the display module may display an overlay of digital markers or modifications to the visual data. Such digital markers or modifications may be digital markers or modifications selected by the user of the HMD. Additionally, the digital markers or modifications may be imported from at least one of the user computing devices 102-108 over the communication network 110.

Figure 3:
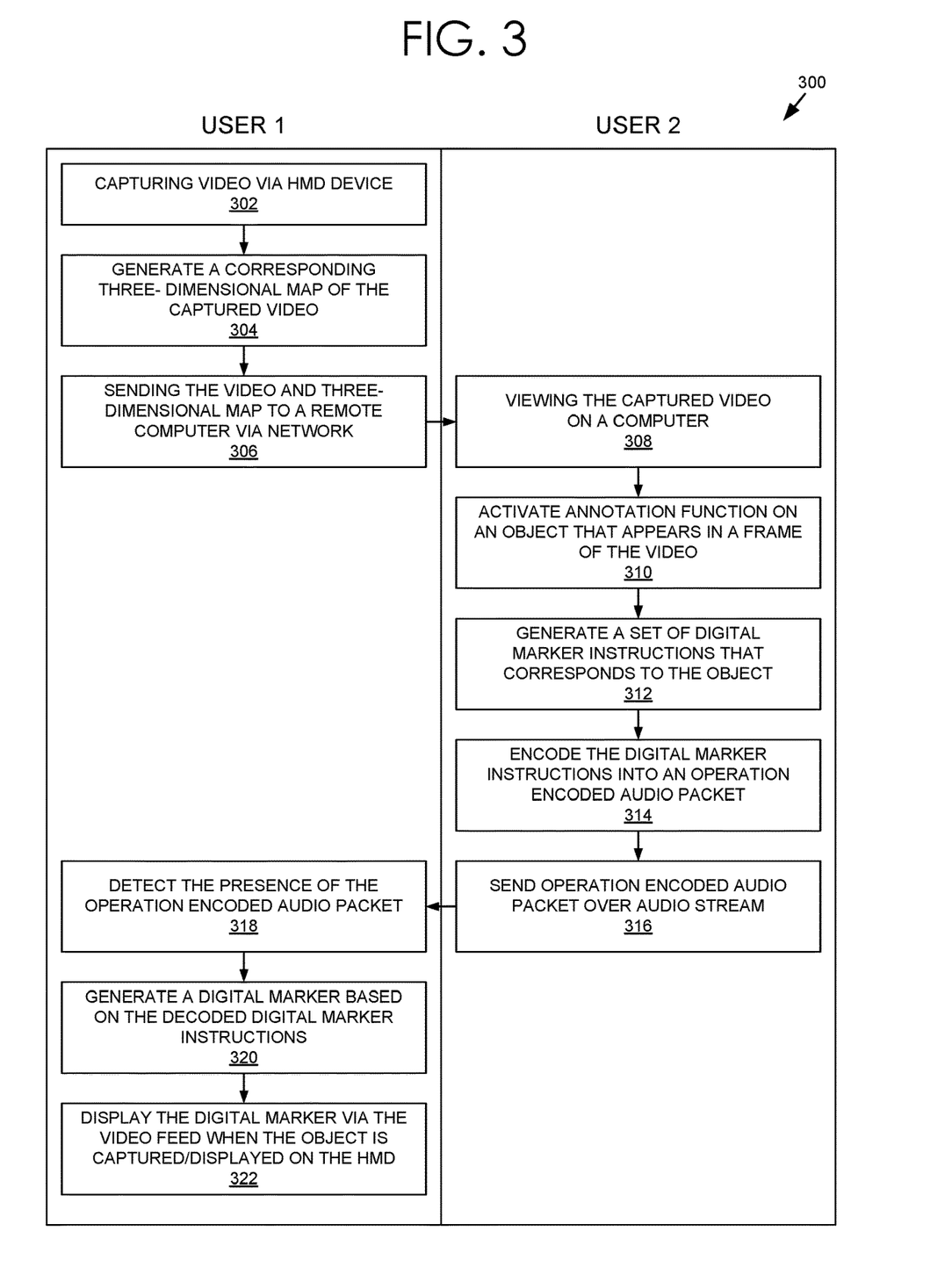
FIG. 3 is a flow diagram showing a method, in accordance with embodiments described herein.

Turning now to FIG. 3, a process flow diagram 300 is provided illustrating a method in accordance with embodiments of the present invention. Initially, flow diagram 300 provides a first user, user 1 and a second user, user 2. The first user, in one instance, may be the user of a HMD which may be operated at step 302, to capture video of the FOV of the first user. At step 304, the HMD may then generate a corresponding three-dimensional map of the captured video. As part of the three-dimensional map, the HMD may identify objects within the captured video and assign a location within the three-dimensional map. This location may be a two-dimensional location of the object within the video or it may be a three-dimensional location within the map. At step 306, the HMD may then send the video and three-dimensional map to a remote computer via a network. This network may be operated by a third-party virtual meeting platform which hosts virtual meetings and allows the users to transmit video and audio using a secure network link between the HMD and a remote computing system.

At step 308, the second user may be able to view the captured video on the remote computer. The viewable captured video may be displayed using the virtual meeting platform's application. Using an application separate from the virtual meeting platform, the second user at step 310 may activate the annotation function on an object that may appear in a frame of the video. The object may have a location associated with it based on the three-dimensional map of the video. The application may then at step 312 generate a set of digital marker instructions that corresponds to the object. The digital marker instructions may include the location information of the object. The digital marker instructions may also include any additional information or instructions associated with what type of annotation or marking the second user would like. The digital marker instructions may then be encoded at step 314 into an operation-encoded audio packet. At step 316, the remote computer may send the operation-encoded audio packet over an audio stream to the HMD. The audio stream may be a portion of the live stream operated by the third party virtual meeting platform.

At step 318, the HMD may detect the presence of the operation-encoded audio packet within the audio stream. The detection may occur based on the presence of an audio marker, an audio signal, or some audio bookmark which indicates the start or presence of the operation-encoded audio packet. The operation-encoded audio packet may then be decoded into digital marker instructions. At step 320, a digital marker may be generated based on the decoded digital marker instructions. The digital marker instructions may include the three-dimensional location information of the object the second user identified above. The digital marker instructions also may include instructions of what annotation or modification the second user identified with respect to the object. At step 322, the digital marker is displayed via the video feed when the object is captured and displayed on the HMD. The digital marker may be an annotation associated with the object such as a letter, a shape, or any other modification or annotation. The display of the digital marker may be as a digital overlay where the digital marker is displayed over the video feed being displayed by the virtual meeting platform application.

Figure 4:
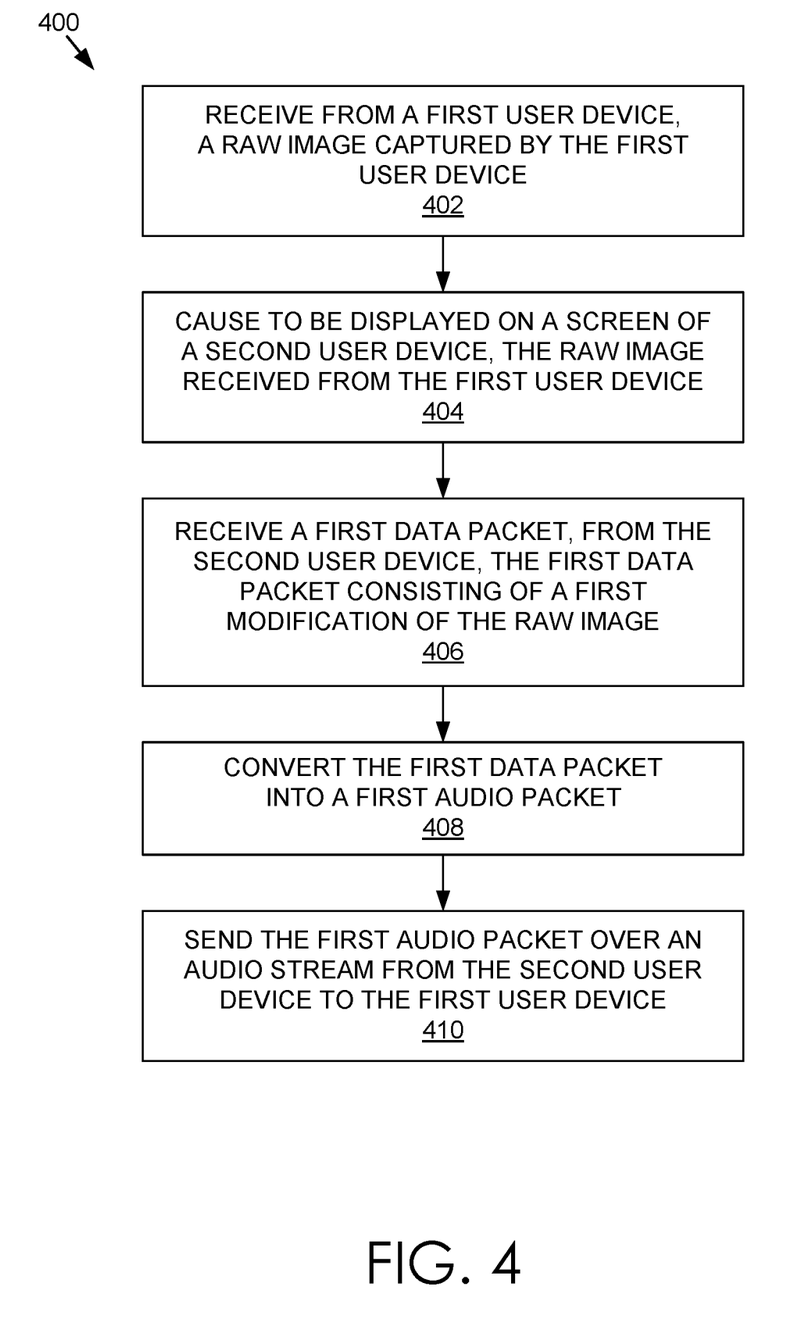
FIG. 4 is a flow diagram showing a method, in accordance with embodiments described herein.
Figure 5:
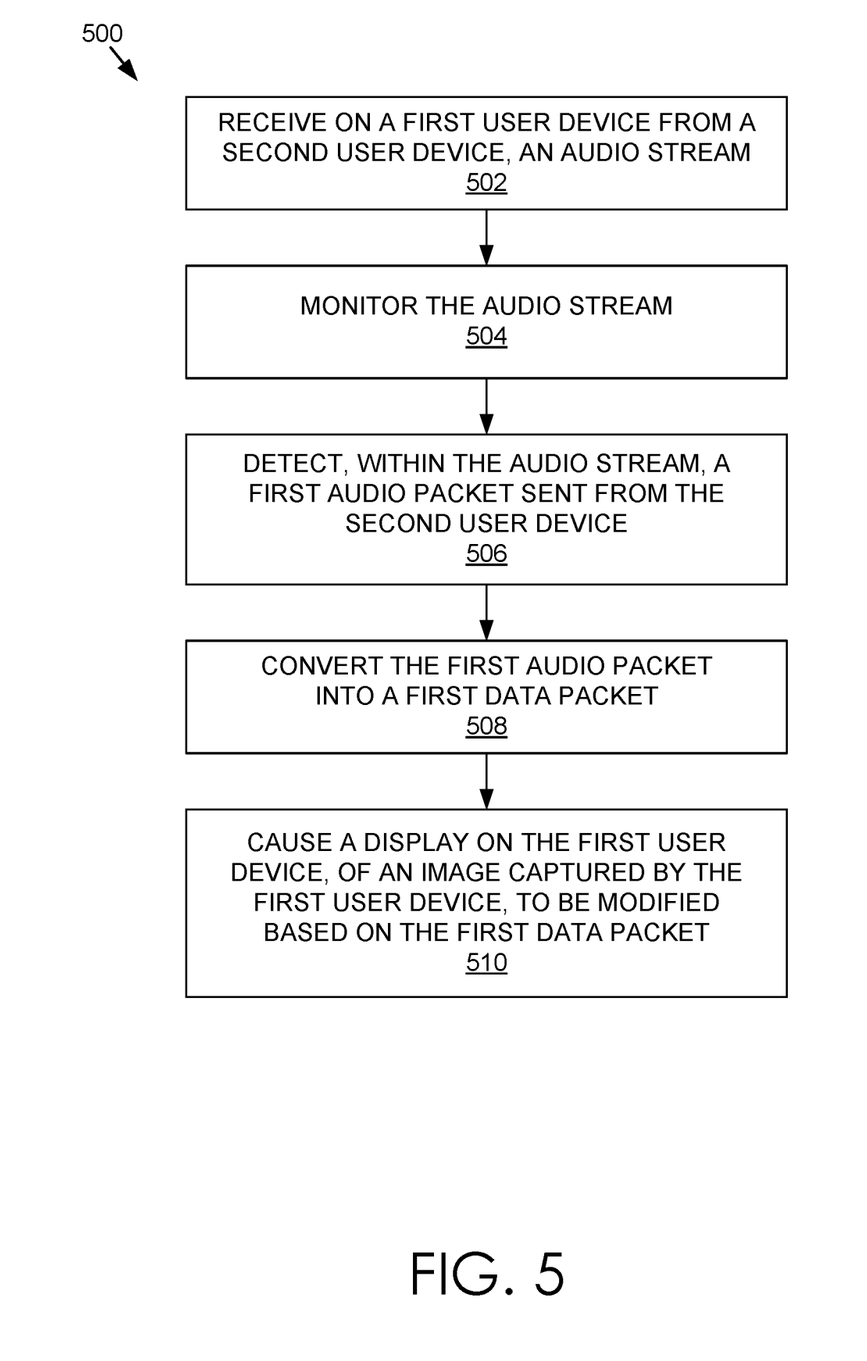
FIG. 5 is a flow diagram showing a method, in accordance with embodiments described herein FIG. 6 provides a block diagram of an exemplary wearable platform in which some implementations of the present disclosure may be employed.

With reference to FIGS. 4 and 5, flow diagrams are provided illustrating methods 400 and 500 for collecting data consisting of desired modifications or digital markers and sending such data as an operation-encoded audio packet to a wearable device to be displayed as a modification or digital marker to a user's displayed visual stream, in accordance with embodiments of the present invention. Each block of methods 400 and 500, and any other methods described herein, comprise a computing process performed using any combination of hardware, firmware, and/or software. For instance, various functions can be carried out by a processor executing instructions stored in memory. The methods can also be embodied as computer usable instructions stored on non-transitory computer storage media. The methods can be provided by a standalone application, a service or hosted service (standalone or in combination with another hosted service), or a plug-in to another product, to name a few. The methods 400 and 500 may be implemented by the operating environment 100 as described in conjunction with FIGS. 1-6.

Turning to FIG. 4, FIG. 4 illustrates method 400 in accordance with embodiments described herein. Initially at block 402, a raw image data is received from a first user device. The first user device may be a wearable device or a HMD device 120 in accordance with various embodiments described herein. The raw image data may be image data collected by the HMD device 120 by a camera which collects video of a FOV of the user. The raw image data may be communicated from the HMD device 120 to at least one user computing device using a third party communication application which is configured to capture video and audio data and display such data with other users. The raw image data may contain both locational information collected about the positions of objects within the FOV of the HMD device and visual data to be displayed. At block 404, the raw image is displayed on a screen of a second user device. In one embodiment, the raw image data is caused to be displayed using a display application or communication application installed on the user computing device.

At block 406, a data packet is received by the user computing device from an application installed on the user computing device. The data packet may comprise a modification, augmentation, or digital marker to an overlay of the raw image data. For example, the user of the application may select a location or an object within the displayed image they desire to annotate or modify. By selecting a location or object, the application creates a data package which may contain the three-dimensional information of the object or location of the desired modification or digital marker. Additionally, the user may select what modification or digital marker to complete at the desired location on the raw image data. The data package may contain information related to how to modify or annotate the raw image data or what to overlay on a display of the raw image data. In one embodiment, the locational information related to the desired digital marker is stored in the data package and may be a two-dimensional coordinate location on the raw image data. In other embodiments, the location of the desired digital marker is determined based on the three-dimensional location image data. For example, the user may select a position on the image which may be an object in the FOV of the user of the HMD device 120. The raw image data may contain the three-dimensional location of that object with respect to the HMD device 120. Such locational information may be included with the data package. Additionally, the data package may be used to display the desired digital marker or modification on the user computing device as an overlay of the displayed raw image data. The data package may also instruct the digital marker application to modify the raw image data to incorporate the desired digital marker at the desired location.

At block 408, the data package is encoded as an operation-encoded audio packet to be sent over a secure audio stream or audio link between the user computing device and the HMD device 120. At block 410, the operation-encoded audio packet is sent over a secure audio stream from the user computing device to the HMD device 120. The secure audio stream may be associated with a secure communication application installed on the wearable platform.

Turning to FIG. 5, FIG. 5 illustrates method 500 in accordance with embodiments described herein. Initially at block 502, an audio stream is received by the HMD device, wherein the received audio stream includes an audio portion and an operation-encoded audio packet portion. At block 504, the audio stream is monitored for the presence of an operation-encoded audio packet. At block 506, the operation-encoded audio packet portion of the audio stream is detected. These operation-encoded audio packets may be a unique combination of chirps or some other type of audible handshake signal. In some instances, the operation-encoded audio packets function at a frequency that is audible to humans and in some instances they are ultrasonic. In some instances, there is an initial tone which alerts the HMD device that there is a operation-encoded audio packet within the audio stream.

At block 508, the operation-encoded audio packet is decoded into a data packet. The data packet may contain similar information as the data packet described above. At block 510, the HMD device may display an image captured by the HMD device in real time. Based on the information contained in the data packet, the image displayed may be modified. For example, the data packet may contain three-dimensional information about an object to be annotated within the captured image. An application may create an overlay which annotates that object within the captured image. In one embodiment, the inertial measurements and the three-dimensional location of the object allow the FOV of the HMD device to move and the digital marker or modification may remain associated with the location of the object.

Having described embodiments of the present invention, an example operating environment in which embodiments of the present invention may be implemented is described below in order to provide a general context for various aspects of the present invention.

Figure 6:
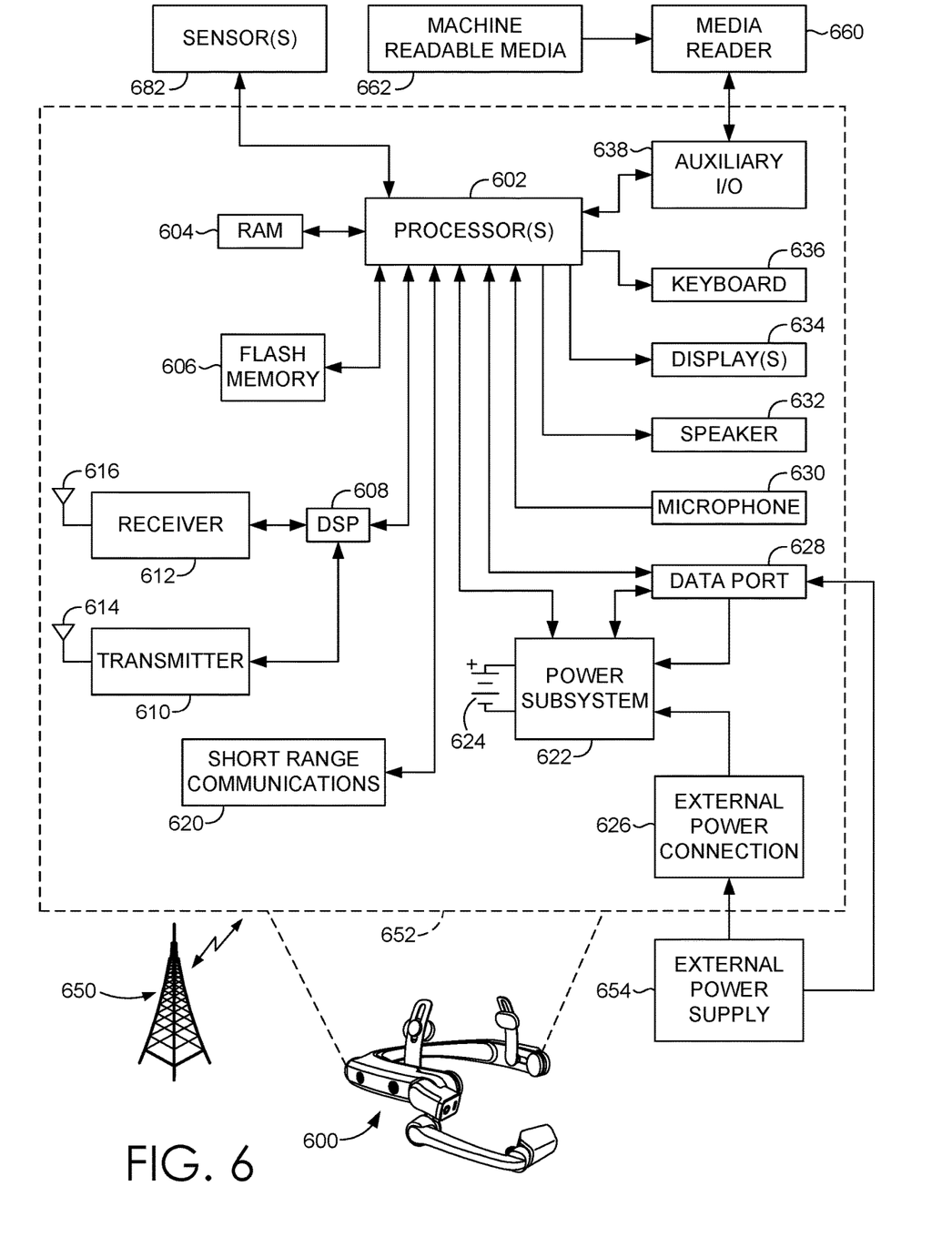

FIG. 6 provides a block diagram of an exemplary wearable device 600 in which some implementations of the present disclosure may be employed. Any of the various embodiments of wearable devices discussed herein, including but not limited to head-mounted display (HMD) device 120 of FIG. 1, may include similar features, components, modules, operations, and the like as wearable device 600. In this example, wearable device 600 may be enabled for wireless two-way communication with voice and data communication capabilities. Such wearable devices communicate with a wireless voice or data network 650 using a suitable wireless communications protocol. Wireless voice communications are performed using either an analog or digital wireless communication channel. Data communications allow the wearable device 600 to communicate with other computer systems via the Internet. Examples of wearable platforms that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable device 600 is an example wearable platform configuration that includes two-way wireless communication functions. Such wearable platforms incorporate communication subsystem elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication subsystem is dependent upon the communication network and associated wireless communication protocols with which the device is intended to operate.

The wearable device 600 includes a microprocessor 602 that controls the overall operation of the wearable device 600. The microprocessor 602 interacts with the above described communications subsystem elements and also interacts with other device subsystems such as flash memory 606, random access memory (RAM) 604, auxiliary input/output (I/O) device 638, data port 628, display 634, keyboard 636, speaker 632, microphone(s) 630, a short-range communications subsystem 620, a power subsystem 622, and any other device subsystems.

A battery 624 is connected to a power subsystem 622 to provide power to the circuits of the wearable device 600. The power subsystem 622 includes power distribution circuitry for providing power to the wearable device 600 and also contains battery charging circuitry to manage recharging the battery 624. The power subsystem 622 includes a battery monitoring circuit that is operable to provide a status of one or more battery status indicators, such as remaining capacity, temperature, voltage, electrical current consumption, and the like, to various components of the wearable device 600, as well as to any peripheral devices connected to the wearable device 600.

The data port 628 is able to support data communications between the wearable device 600 and other devices through various modes of data communications, such as high speed data transfers over optical communication circuits or over electrical data communication circuits such as a USB connection incorporated into the data port 628 of some examples. Data port 628 is also able to support communications with, for example, an external computer, peripheral device, or other device.

Data communication through data port 628 enables a user to set preferences through an external device or through a software application and extends the capabilities of the device by enabling information or software exchange through direct connections between the wearable device 600 and external data sources rather than via a wireless data communication network. In addition to data communication, the data port 628 may provide power to the power subsystem 622 to charge the battery 624 or to supply power to the electronic circuits, such as microprocessor 602, of the wearable device 600.

Operating system software used by the microprocessor 602 may be stored in flash memory 606. Further examples are able to use a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604.

The microprocessor 602, in addition to its operating system functions, is able to execute software applications on the wearable device 600. A predetermined set of applications that control basic device operations, including at least data and voice communication applications, is able to be installed on the wearable device 600 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the wearable device 600 through, for example, the wireless network 650, an auxiliary I/O device 638, data port 628, short-range communications subsystem 620, or any combination of these interfaces. Such applications are then able to be installed by a user in the RAM 604 or a non-volatile store for execution by the microprocessor 602.

In a data communication mode, a received signal such as a text message or web page download is processed by the communication subsystem, including wireless receiver 612 and wireless transmitter 610, and communicated data is provided to the microprocessor 602, which is able to further process the received data for output to the display 634, or alternatively, to an auxiliary I/O device 638 or the data port 628. A user of the wearable device 600 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication subsystem.

For voice communications, overall operation of the wearable device 600 is substantially similar, except that received signals are generally provided to a speaker 632 and signals for transmission are generally produced by a microphone 630. Alternative voice or audio I/O subsystems, such as a voice message recording subsystem, may also be implemented on the wearable device 600. Although voice or audio signal output is generally accomplished primarily through the speaker 632, the display 634 may also be used to provide an indication of the identity of a calling party, the duration of a voice call, or other voice call related information, for example.

Depending on conditions or statuses of the wearable device 600, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 620 provides for data communication between the wearable device 600 and different systems or devices, which need not necessarily be similar devices. For example, the short-range communications subsystem 620 includes an infrared device and associated circuits and components or a radio frequency (RF) based communication module such as one supporting Bluetooth® communications, to provide for communication with similarly enabled systems and devices, including the data file transfer communications described above.

A media reader 660 connectable to an auxiliary I/O device 638 to allow, for example, loading computer readable program code of a computer program product into the wearable device 600 for storage into flash memory 606. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the wearable device 600 through the data port 628 or computer readable program code is alternatively able to be provided to the wearable device 600 through the wireless network 650.

FIG. 6 provides a block diagram of an exemplary computing device 600 in which some implementations of the present disclosure may be employed. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated. Any computing device discussed herein, such as but not limited to user computing devices 102-108 of FIG. 1, or any of the wearable devices discussed herein, may include similar operations, features, components, modules, and the like, as included in computing device 600.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communication network.

Figure 7:
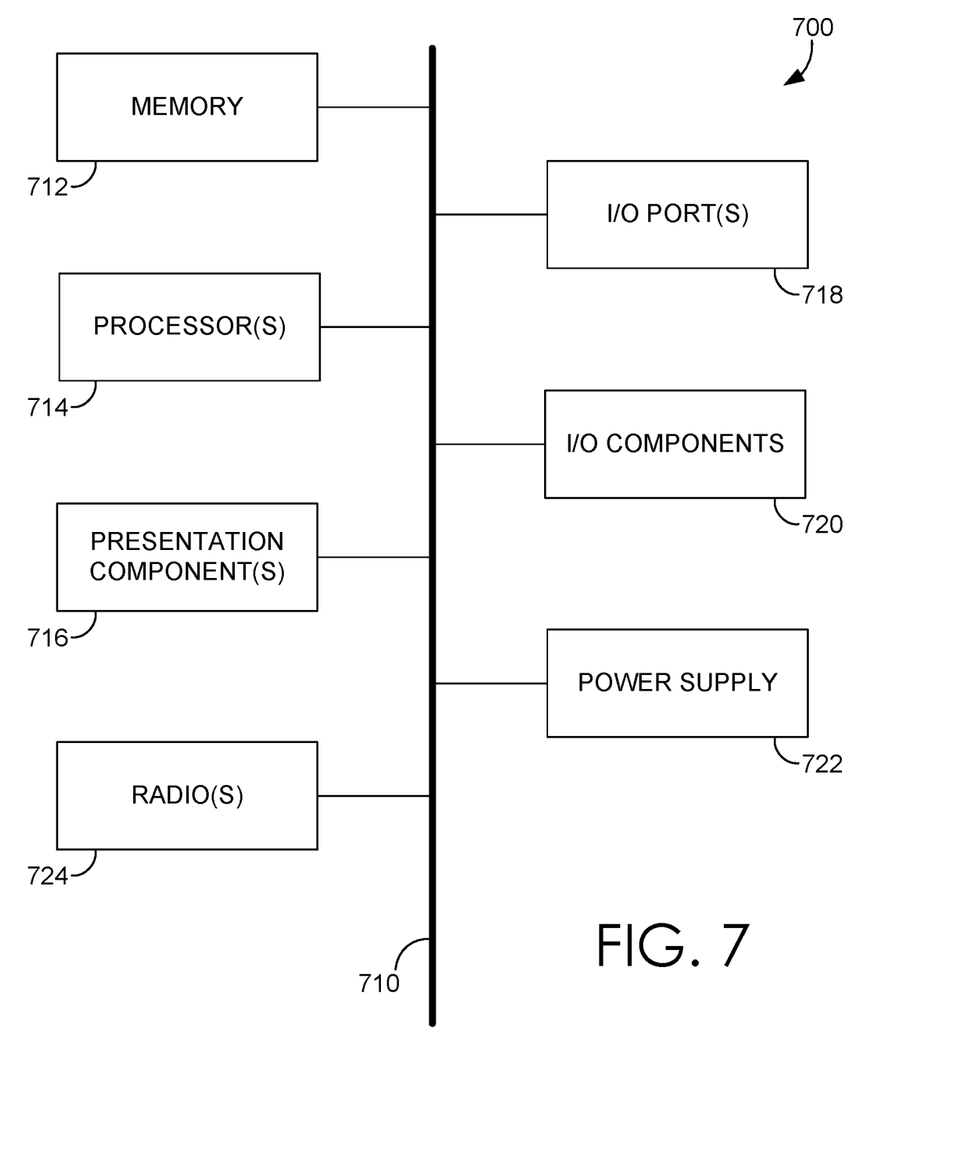
FIG. 7 provides a block diagram of an exemplary computing device in which some implementations of the present disclosure may be employed.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or another device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Many variations can be made to the illustrated embodiments of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing, it will be seen that this invention is one well adapted to attain all ends and objects hereinabove set forth together with the other advantages which are obvious and which are inherent to the structure. It will be understood that certain features and sub-combinations are of utility and may be employed without reference to other features and sub-combinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A head-mounted computing device comprising:
    a visual display module;
    one or more processors;
    one or more memory devices storing programmable instructions thereon that, when executed by the one or more processors, cause the one or more processors to execute operations comprising:
    streaming video data captured via a camera to a remote user device, wherein the video data is displayed via the visual display module as it is being captured;
    receiving an audio stream from the remote user device while the video data is being streamed;
    detecting an audio packet that is included in the audio stream, the audio packet defining an annotation that corresponds to an object in the video data;
    decoding the audio packet to extract the annotation for the object; and
    modifying the streamed video data to include the annotation corresponding to the object.

2. The device of claim 1, wherein a user device encodes the annotation that corresponds to t he object in the video data.

3. The device of claim 2, wherein the user device data packet includes instructions for a computer processor to modify an image on an application installed on the head-mounted computing device.

4. The device of claim 3, wherein the user device data packet includes a first location on the image, the first location being a set of coordinates associated with the image indicating where a user indicates to modify the image.

5. The device of claim 4, wherein the set of coordinates are a three-dimensional set of coordinates.

6. The device of claim 5, wherein the first location includes the three-dimensional set of coordinates based and a set of location tracking information.

7. The device of claim 6, wherein the set of location tracking information includes a set of inertial measurements detected by the head-mounted computing device related to a position of the object in a field of view of the head-mounted computing device in relation to the position of the head-mounted computing device.

8. The device of claim 1, wherein the visual display module uses a communication network application to cause the display of an image.

9. The device of claim 8, wherein the modifying the display of the image uses a modification application which causes to be displayed as an overlay over the image, wherein the overlay includes the modification.

10. A non-transitory computer storage medium storing computer-useable instructions that, when used by one or more computing devices, cause the one or more computing devices to perform operations comprising:
    streaming video data captured via a camera on a head-mounted computing device to a remote user device, wherein the video data is displayed via a visual display module as it is being captured;
    receiving, an audio stream from the remote user device while the video data is being streamed;
    detecting an audio packet that is included in the audio stream, the audio packet defining an annotation that corresponds to an object in the video data;
    decoding the audio packet to extract the annotation for the object; and
    modifying the streamed video data to include the annotation corresponding to the object.

11. The computer storage medium of claim 10, wherein the secure audio link is established between the one or more computing devices and the head-mounted computing device using a communication application.

12. The computer storage medium of claim 11, wherein the annotation for the object includes instructions for a second application installed on the head-mounted computing device to modify an image.

13. The computer storage medium of claim 11, wherein the annotation for the object includes a first location on an image, the first location being a set of three-dimensional coordinates associated with the captured indicating where a user desires to modify the image and a set of location tracking information.

14. The computer storage medium of claim 13, wherein the set of location tracking information includes a set of inertial measurements detected by the head-mounted computing device related to a position of the object in a field of view of the head-mounted computing device in relation to the position of the head-mounted computing device.

15. The computer storage medium of claim 14, further comprising causing a display of the image on the head-mounted computing device to be modified.

16. The computer storage medium of claim 15, wherein the display of the image on the head-mounted computing device is modified such that the object and the modification are spatially linked based on a three-dimensional location of the object and a three-dimensional location of the modification.

17. A computer-implemented method comprising:
    streaming video data captured via a camera on a head-mounted computing device to a remote user device, wherein the video data is displayed via a visual display module as it is being capture;
    receiving, an audio stream from the remote user device while the video data is being streamed;
    detecting an audio packet that is included in the audio stream, the audio packet defining an annotation that corresponds to an object in the video data;
    decoding the audio packet to extract the annotation for the object; and
    modifying the streamed video data to include the annotation corresponding to the object.

18. The method of claim 17, wherein the the annotation for the object includes instructions for a computer processor to modify an image on a second application installed on the head-mounted computing device, a first location of the object associated with the modification within the image, the first location being a set of three-dimensional coordinates and a set of location tracking information.

19. The method of claim 18, wherein the set of location tracking information includes a set of inertial measurements detected by the head-mounted computing device related to a position of the object in a field of view of the head-mounted computing device in relation to the position of the head-mounted computing device.

20. The method of claim 17, wherein the visual display module uses a communication network application to cause the display of an image on the head-mounted computing device and uses a modification application which causes to be displayed an overlay over the image, wherein the overlay includes the modification.

* * * * *

UNITED STATES PATENT AND TRADEMARK OFFICE
CERTIFICATE OF CORRECTION

Page 1 of 1

PATENT NO. : 12,041,388 B2
APPLICATION NO. : 17/805948
DATED : July 16, 2024
INVENTOR(S) : Chris Parkinson It is certified that error appears in the above-identified patent and that said Letters Patent is hereby corrected as shown below:

In the Claims

Column 16, Claim 2, Line 66:
In the line reading "the annotation that corresponds to t he object in the video" should read -- the annotation that corresponds to the object in the video --

Column 18, Claim 17, Line 24:
In the line reading "module as it is being capture;" should read -- module as it is being captured; --

Column 18, Claim 18, Line 34:
In the line reading "18. The method of claim 17, wherein the the annotation" should read -- 18. The method of claim 17, wherein the annotation --

Signed and Sealed this
Twenty-second Day of October, 2024

Katherine Kelly Vidal
*Director of the United States Patent and Trademark Office*